Nov. 21, 1939.                J. D. ROBINSON                2,181,069
                    MEANS AND METHOD FOR CHLORINATING WATER
                    Filed Oct. 15, 1939          2 Sheets-Sheet 2
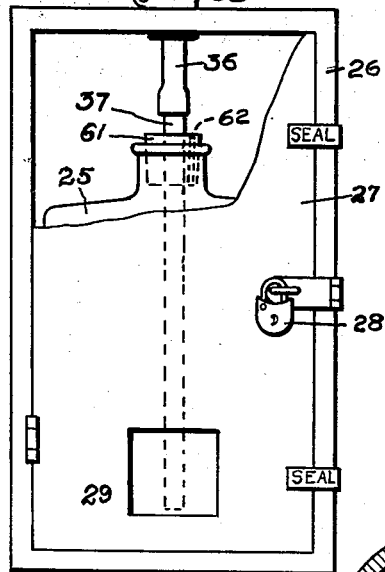
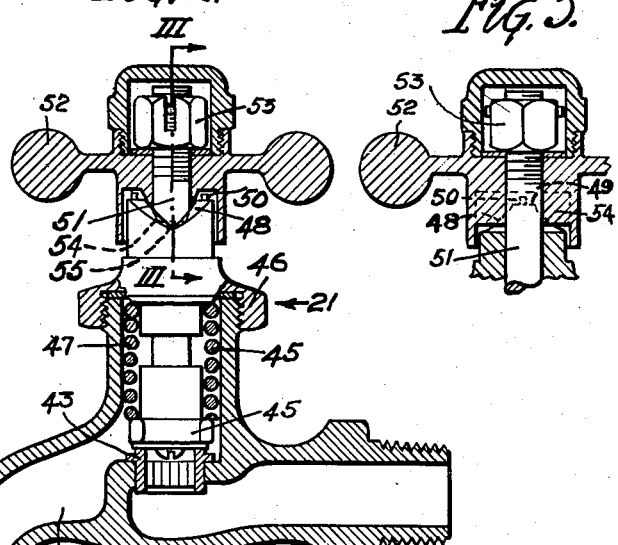
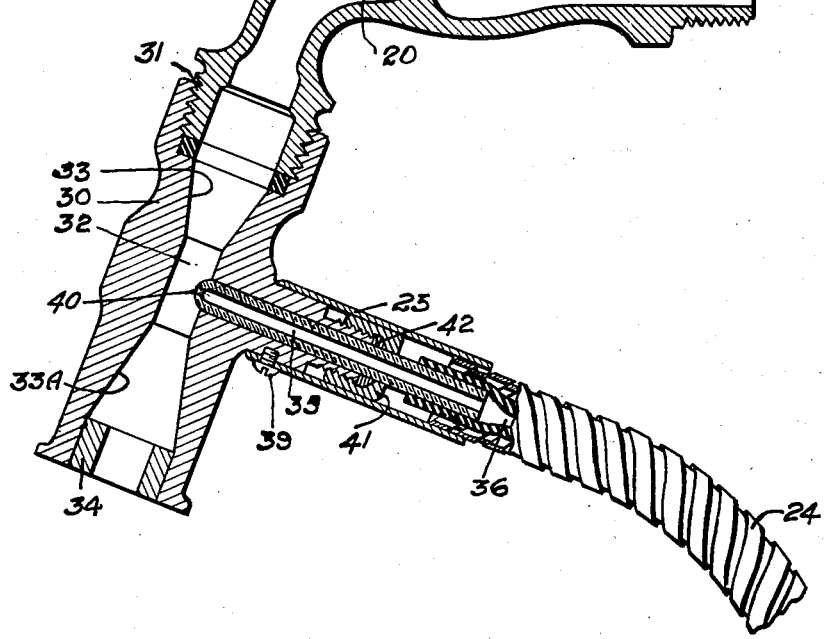
INVENTOR
JAMES D. ROBINSON
By J. H. Weatherford
Atty.

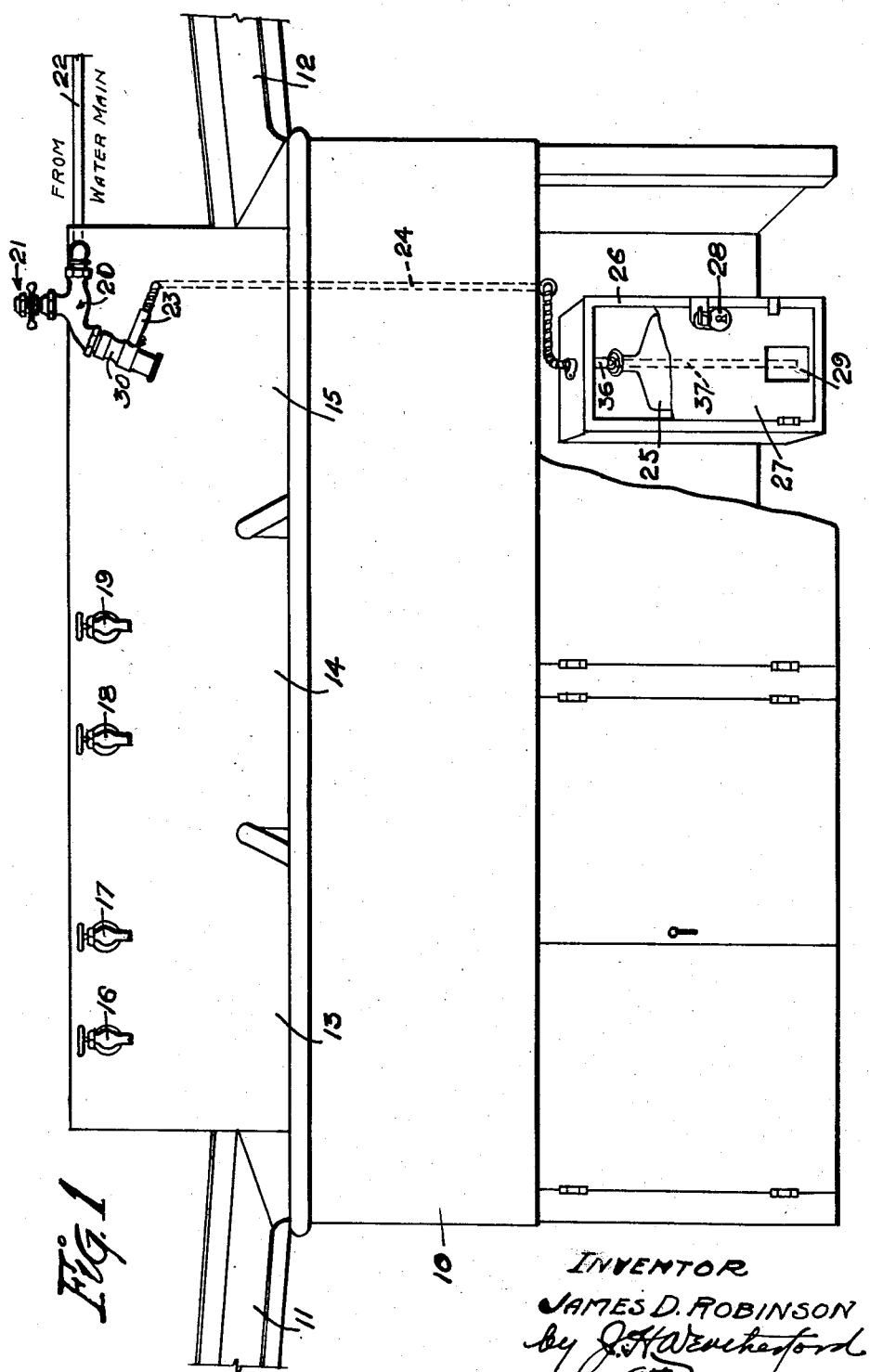

Patented Nov. 21, 1939

2,181,069

UNITED STATES PATENT OFFICE 2,181,069

MEANS AND METHOD FOR CHLORINATING WATER

James D. Robinson, Memphis, Tenn.

Application October 15, 1938, Serial No. 235,216

2 Claims. (Cl. 210—28)

This invention relates to a device for chlorinating water, and particularly to a device for supplying to a limited amount or batch of water a relatively extremely limited quantity of chlorinating material.

In washing dairy utensils, dishes, glasses and tableware, as in restaurants, and in many other situations, it is found substantially impossible with the use of water and soap or other washing compounds in ordinary installations to completely sterilize the articles. It has further been found that a very limited amount of chlorine in water will accomplish sterilization, and such method of sterilization is now accepted by practically all authorities. Numerous attempts have been made to draw and enforce ordinances compelling the use of chlorine in some of its forms, for such purpose, but great difficulty has been found in enforcing such ordinances because the supply of chlorine added has had to be left to the human element, and no known method has been found by which enforcement of the ordinances could be had.

Devices are known which through utilization of the flow of water cause sterilizing material to be introduced into water, but these devices have been devised for use in connection with either a substantially continuous flow, or in connection with extremely large quantities, in either of which cases a slight variation in the amount of chlorinating material, being in relation to a large volume of water, is substantially immaterial. These known devices depend for their operation upon the opening of a valve by hand which may, according to the wish or whim of the operator, be opened to allow passage of either a full or limited quantity of water.

As these devices for their operation depend upon the action of a vacuum created by the passage of the water being sterilized, if the valve be but partly opened and a very limited flow permitted thereby, effective operation is defeated, and the water so passing will go unsterilized. In the known devices however check may be made, and ordinarily is made, from time to time and such conditions are corrected. Such devices however are fatally ineffective in batch devices, in which such checks obviously cannot be made for each batch and in that they permit the operator through either design or carelessness to make use of unsterilized water. The known devices also discharge the sterilizing liquid downward into the water flow and incorporate chambers from which discharge may occur after cut off.

The objects of the present invention are primarily to provide simple and efficient means and methods for accomplishing chlorination of small volumes or batches of water.

A further object is to provide means which will show at a glance to an inspecting agent whether the apparatus has been used, or has been tampered with, as to avoid use, since it was last inspected.

A further object of the invention is to provide means to insure that successive batches of water required to be sterilized will each receive substantially uniform chlorination.

The means by which the foregoing and other objects are accomplished and the manner of their accomplishment will readily be understood from the following specification on reference to the accompanying drawings, in which:

Fig. 1 is a perspective view of a typical sink layout for washing and sterilizing dishes with my apparatus applied thereto.

Fig. 2 is a sectional elevation of the preferred form of nozzle for effecting the chlorination.

Fig. 3 is a fragmentary sectional elevation of such nozzle taken on the line III—III of Fig. 2 and substantially at right angles to Fig. 2; and Fig. 4 is a view of the chlorine solution container and the enclosure therefor, showing sealing means in connection therewith, which means indicates whether or not access has been had to the container since inspection.

Referring now to the drawings in which the various parts are indicated by numerals:

10 is a typical sink for the washing of dishes, the sink having drainboards 11 and 12 at its opposite ends. The sink illustrated is divided into a compartment 13 for washing dishes, a compartment 14 for rinsing and a compartment 15 for sterilizing the dishes. The compartment 13 is provided with the usual hot and cold water faucets 16 and 17 and the rinse section 14 with similar faucets 18 and 19. The sterilizing compartment is provided with a single faucet 20 which for economic use of a chlorine solution should be a cold water faucet and which is calibrated to deliver a predetermined flow of water. This faucet is provided with a control valve 21, and is fed through a pipe 22 leading from the usual water main, (not shown). 23 is a sleeve, and 24 indicates generally a tubular structure, which structure leads directly upward to the faucet 20, the lower end of the structure extending downward to a connection with a bottle 25 adapted to contain a chlorinating solution, this bottle being hereinafter designated as the source of chlorinating solution. The bottle 25 is preferably housed in a cabinet 26 having a suitably hinged door 27 which may be locked, as by a lock 28, to prevent unauthorized access to this source. Preferably when this door is shut and locked, seals, as shown, are so pasted on the door and cabinet that they must be broken if such door is opened. Preferably the door 27 of the cabinet is provided near the bottom with a window 29, through which at least the lower part of the bottle may be observed without opening the cabinet.

The faucet 20 is provided with a nozzle 30, threadedly attached to the discharge end of the faucet at 31. The nozzle 30 is reduced intermediate its length to form a Venturi section, the throat of said section being indicated by numeral 32, the approach surface 33 leading to the throat being much more abrupt than is usual in Venturi sections to effect a sharp reduction of pressure in the throat and actually setting up a vacuum for the raising of the chlorinating fluid; and the discharge section 33—A being likewise abrupt largely for reducing the over all length of the nozzle. 34 is an inwardly turned annular flange preferably formed as shown by the insertion of a plug, said flange serving to minimize spraying of the water discharged. This plug also serves to minimize or prevent during flow of the water, back flow of air bubbles to the Venturi throat, which back flow is probably incident to the shortening of the discharge section. The sleeve 23 and tube structure 24 enclose a short section of glass tubing 35, and a rubber tube 36 which extends continuously into the cabinet 26, and is there connected to a glass tube 37 which extends substantially to the bottom of the bottle. Both the glass tube and rubber tube have extremely restricted bores to reduce their over all volume to a minimum. The conduit thus formed extends directly upward from the chlorine supply (bottle 25) to the nozzle and by gravity action is adapted to establish a sharp cutoff of the chlorination flow concurrently with cessation of water flow. The tubular structure 24 extends within and snugly engages the sleeve 23, and is secured by a clamping sleeve 38 to the cabinet 26. The sleeve 23 is attached to the nozzle 30 by set-screw 39. The glass tubing 35 is reduced in diameter at its inner end to leave an almost microscopic opening 40 into the throat 32 of the Venturi section, an opening $18/1000$ inch in diameter having been used with an ½ inch faucet to deliver 200 parts of chlorine solution per million. The end of the glass tubing 35 adjustably protrudes into the throat 32, this adjustment being accomplished by loosening packing nut 41, which holds in position and clamps packing 42, and protruding or retracting the glass tubing as desired.

The control valve 21 includes a seat 43, and a closure member 44, adapted to be held against the seat 43 by a compression spring 45. The spring 45 seats against the under side of a cap 46 which has a central bore and which is threadedly engaged to a sleeve portion 47 forming an integral part of the valve structure. The cap 46 carries at its upper end integral cam seats 48, which diverge upwardly and terminate in flat shoulders 49. 50 are oppositely disposed stop pins projecting upward from these shoulders. 51 is a valve stem, secured to the closure member 44 and extending upward through the bore of the cap 46, and through the center of a handle 52, which is preferably turnably mounted thereon.

The handle 52 is retained on the stem 51 by a nut 53, the upper end of the stem being threaded to receive the nut. 54 are cams complementary to the cam seats 48, which are integral with the under side of the handle 52, and project downward therefrom. The cams terminate in flattened end surfaces 55 which are adapted to ride onto the shoulders 49 and be supported thereon, the turning movement of the cams being limited by the stop pins 50. The lift of the complementary cams and cam surfaces establishes the amount of valve opening, and the structure requires the full opening of the valve in order that the valve may remain in open position against the pull of the closure spring 45. The action of the spring 45 in closing insures that the valve will at all times fully close and effectually cut off any small flow of water past the chlorine orifice which might otherwise have a tendency to leak into the container and weaken the solution therein.

The glass tube 37 is inserted through a cork 61 into the bottle 25, the cork being provided with a vent 62.

It has been found that variations in water pressure have little effect except that pressures much lower than usual in municipal water systems may require a reduction in the area of the throat 32, in fact a nozzle having a ¼ inch throat for an ½ inch service pipe has been made and is in use for pressures under 25 pounds, as contrasted with a $\frac{1}{8}$ throat for the same size pipe in usual practice.

In setting the device up for use the faucet 20 is installed over the receptacle which is adapted to receive the articles to be sterilized. If there be water connections to this receptacle, the cold water faucet is replaced by the faucet 20; if not, a suitable water connection is made. If there also is a hot water connection for this receptacle, it is preferable that this be sealed off in order that it be easier to furnish chlorinated than unchlorinated water to the receptacle. The cabinet 26 is installed adjacent and at a lower level than the faucet, and the chlorinating tube of the faucet is connected through the top of the cabinet. The faucet selected is one that has been calibrated with relation to the chlorination tube orifice to deliver the proper proportion of that chlorinating solution which is available, to the water which flows through the faucet when the latter is open. After installing, the chlorinated water in the receptacle may be tested and if not of required strength the protrusion of the glass tube 35 into the throat 32 is adjusted by loosening packing nut 41, and making such adjustment as is required, it having been found that variation of this protrusion will vary the proportion of chlorinating solution to the water. When proper adjustment has been made the packing nut 41 is tightened to clamp the packing 42 against the tube and hold it in adjusted position. The sleeve 23 is then slipped to place and secured by set screw 39.

With the installation complete and the chlorinating solution connected up to the faucet, the water may be turned in by fully opening valve 21, which is held open by the operation of the cam device 45. If the valve is not opened fully, the action of spring 45 will return the valve to the closed position when released and flow of water will be cut off. The water flows through the faucet and nozzle 30 and in passing through the Venturi throat of the nozzle draws the solution through tubes 35, 36, raising the solution directly from its source to the throat where it is mixed with the water passing and is delivered into the receptacle.

With the layout shown in Fig. 1, dishes or the like may be washed in the compartment 13 of the sink and rinsed in the compartment 14; and thereafter be sterilized by dipping them in chlorinated water in the compartment 15; after which they are set aside to drain and dry.

It will be understood that if the articles chlorinated must be immediately used, they may be again rinsed by running water from one of the faucets 18, 19 or 16, 17 over them, but that under no circumstances are they to be again dipped into the wash or rinse water unless again chlorinated. It will further be understood that additional faucets may be added for this specific purpose so long as they do not discharge or drain into the chlorinating compartment, and reduce the strength of the solution therein.

It will be particularly noted that as the valve will remain open unattended only when fully opened, the possibility of obtaining unchlorinated water is reduced to a minimum, since the area of flow obtained is definite, in relation to the area of flow of chlorinating solution, and substantially the only manner in which flow may be satisfactorily obtained is in such amount as will by its passage draw the chlorinating solution into the nozzle in the desired proportion. Once installed there is every incentive for continued use of the apparatus and little excuse for failure to so use. In addition, where inspections are made it is usual for the inspector to show up at unusual times, and if none of the connections or seals have been disturbed it would appear a reasonable assumption that the device has been continuously used since his last visit, particularly if a record is kept for each individual installation of the amount of chlorinating solution in the bottle at the time of the first visit and a comparison of this amount with the amount in the bottle is made at the later visit.

It will be understood that numerous variations may be made without departing from the intent of my device and it is not my intention to limit myself except as in any claim such limitation may be set out.

I claim:

1. A device for introducing a sterilizing fluid into a liquid for washing plates, glasses and the like, comprising liquid supply means for supplying liquid under pressure, a nozzle operatively attached to said liquid supply means, said nozzle having a Venturi section including a restricted throat, sterilizing fluid supply means, fluid connection means from said fluid supply means to said restricted throat, said fluid connection means extending upwardly to said restricted throat and terminating in a tube extending upwardly into said throat, said tube having a calibrated orifice substantially at the end thereof, whereby the flow of liquid through said nozzle raises sterilizing fluid into mingling contact with said liquid, and whereby gravitation establishes sharp cut-off of said fluid upon the cessation of liquid flow.

2. A device for introducing a sterilizing fluid into a liquid for washing plates, glasses, and the like, comprising a nozzle adapted to be attached to the end of a downwardly extending liquid supply pipe connected to a source of liquid under pressure, said nozzle having a Venturi section including a restricted throat and having an opening through the side wall thereof opposite said restricted throat, a tube extending through said opening and upwardly into said throat, said tube being adjustable inwardly and outwardly across at least a portion of said throat and having a minute orifice substantially at the inner end thereof, adjustable means engaged with said nozzle and said tube for holding said tube in any one of a plurality of adjusted positions, a fluid supply line connected with the outer end of said tube, said line extending downwardly to a fluid supply reservoir whereby, upon cessation of the flow of liquid under pressure to said nozzle, the supply of sterilizing fluid to the nozzle will be sharply cut off.

JAMES D. ROBINSON.